J. G. VINCENT.
ATTACHMENT FOR MOTOR VEHICLES.
APPLICATION FILED DEC. 16, 1914. RENEWED AUG. 23, 1918.
1,282,501.
Patented Oct. 22, 1918.
2 SHEETS—SHEET 1.
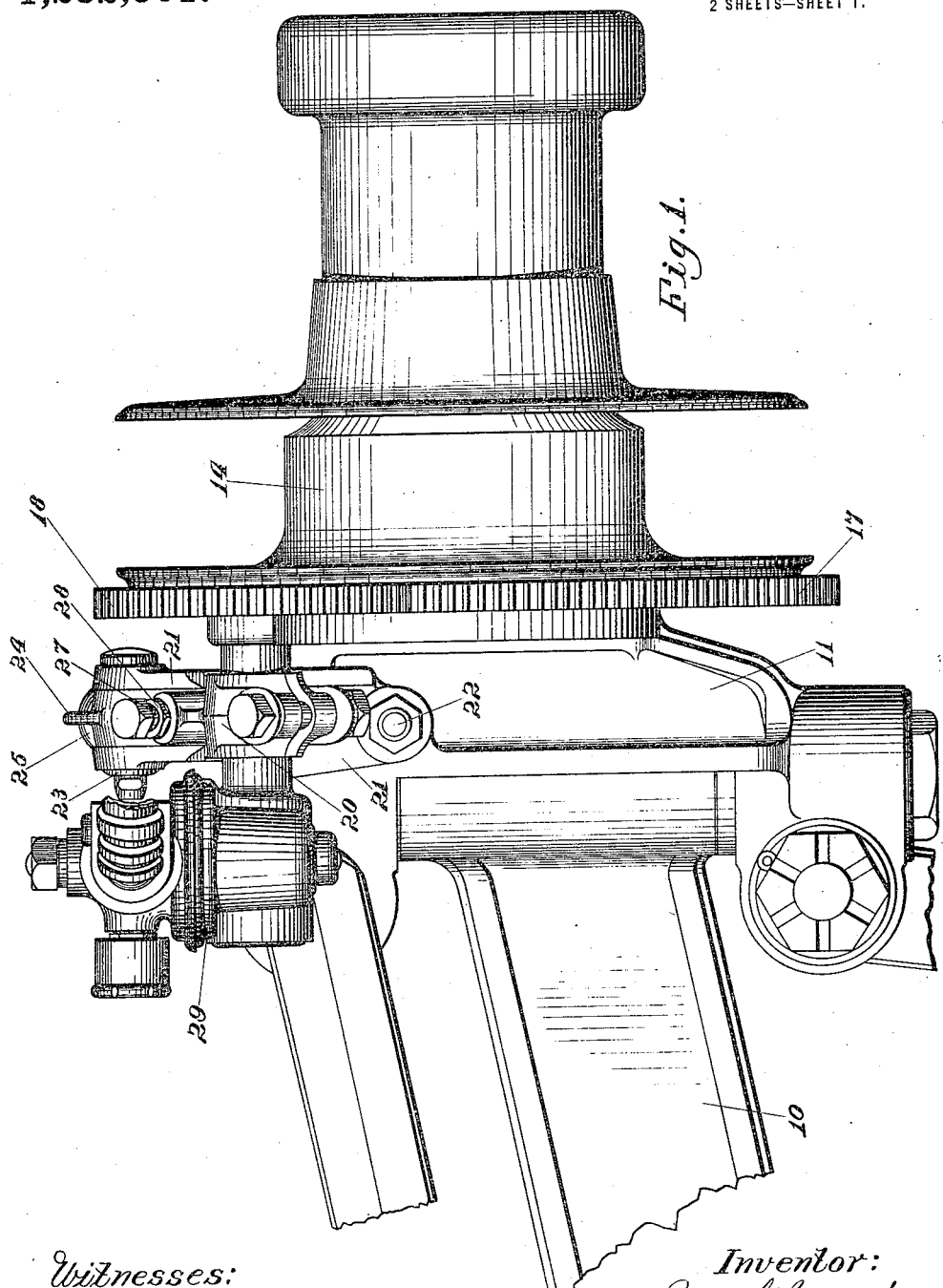
Witnesses:
Clair J. Cote,
Le Roi J. Williams.
Inventor:
Jesse G. Vincent,
By Milton Tibbetts,
Attorney.

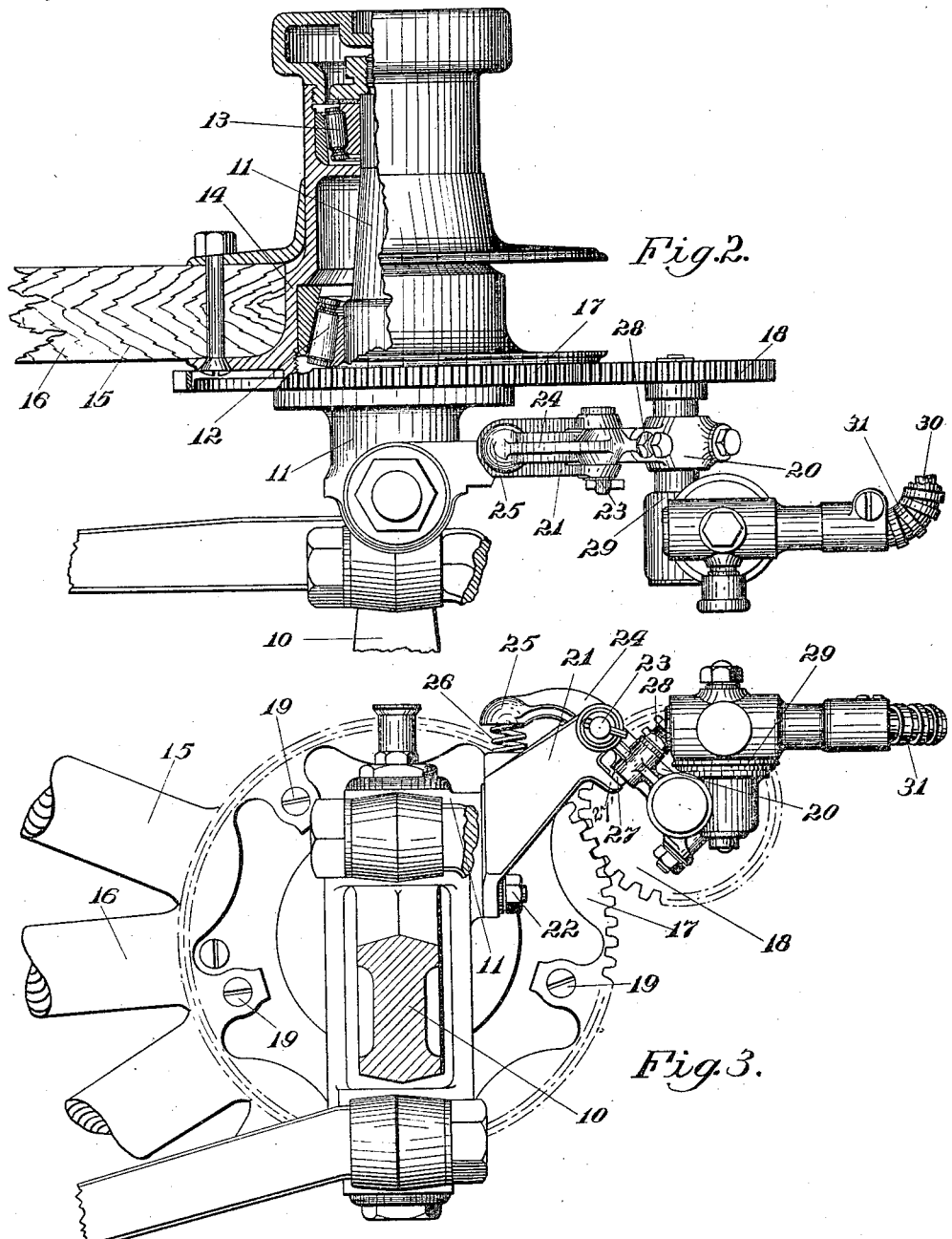

UNITED STATES PATENT OFFICE.

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN.

ATTACHMENT FOR MOTOR-VEHICLES.

1,282,501.  Specification of Letters Patent.  Patented Oct. 22, 1918.

Application filed December 16, 1914, Serial No. 877,534. Renewed August 23, 1918. Serial No. 251,119.

*To all whom it may concern:*

Be it known that I, JESSE G. VINCENT, a citizen of the United States, and resident of Detroit, Wayne county, State of Michigan, have invented certain new and useful Improvements in Attachments for Motor-Vehicles, of which the following is a specification.

This invention relates to motor vehicles and particularly to means for transmitting the rotations of one of its revolving parts, such as a wheel, to a registering or recording instrument.

One of the objects of the invention is to provide in such a mechanism a yielding engagement between two of the transmitting elements.

The invention may be embodied in various forms one form being shown herein as merely illustrative of the invention.

In the form shown herein the invention is applied to the front or steering axle of a motor vehicle, and generally speaking, it comprises a yieldingly mounted bracket for a speedometer driving shaft and transmitting gears, and a gear mounted on the vehicle wheel in mesh with one of the gears supported on the bracket. This provides a yielding engagement between the gears for preventing injury to the gears or other mechanism in case of a stone or other obstruction passing between the gears.

Other objects of the invention will appear from the following description taken in connection with the drawings which form a part of this specification, and in which:—

Figure 1 is an elevation of a portion of a motor vehicle axle embodying the invention;

Fig. 2 is a plan view of the parts shown in Fig. 1, on a slightly reduced scale, parts of the wheel being shown in section; and Fig. 3 is an elevation looking from the left in Fig. 1.

Referring to the drawings, the stationary part of the axle is indicated at 10, and the spindle part 11 is shown as pivoted thereto in the usual manner. More of the spindle part is shown in Fig. 2 than in the other figures, and the two bearings 12 and 13 for the wheel hub 14 are shown in said Fig. 2 also. One of the wheel spokes is shown at 15, and the wheel as a whole may be indicated by the numeral 16, the wheel being adapted to rotate on the spindle 11 as will be understood.

A gear wheel 17 and a second gear wheel 18 meshing therewith are arranged respectively upon the wheel and the spindle, and means are provided for yieldingly supporting the gears in mesh. As shown, the gear 17 is rigidly supported upon the wheel, being secured thereto as by the screws 19, and the gear 18 is so supported upon the spindle part 11 of the axle that it is in yielding engagement with the gear wheel 17. The gear 18 is mounted to rotate in a bracket 20, which is pivotally supported eccentrically of the axis of the gear wheel 18 upon an arm 21 which may if desired be detachably fastened to the spindle 11 as by the bolts and nuts 22.

The pivotal point of the bracket 20 is at 23, and the bracket is formed with an arm 24 between which and an abutment 25, is a spring 26. The spring 26 yieldingly presses the arm 24 upwardly as shown in Fig. 3 and thus tends to turn the bracket 20 on its pivot 23 and move the axis of the wheel 18 toward the axis of the gear wheel 17. Thus the gear wheels 17 and 18 are held in yielding engagement with each other for the purpose above stated.

For the purpose of preventing the gear from getting too closely into mesh and thereby producing an improper fit of the gear, a stop 27 and abutment 27' are provided. This stop 27 is adjustable in the bracket 20 toward and from the abutment and it may be locked in adjusted position by means of a nut 28.

Suitable transmitting mechanism 29 is also mounted upon the bracket 20 and operatively connected with the gear wheel 18, and a flexible shaft 30 supported in a flexible housing 31, extends from said transmitting mechanism to the speedometer or other indicator mechanism with which the invention is adapted to be connected.

It will be understood that the invention is not limited to the exact construction shown, but that various modifications may be used without departing from the spirit or scope of the invention.

Having thus described my invention, what I claim and desire to secure by Letters Patent, is:—

1. The combination with a spur gear, of a second spur gear mounted to rotate in the same plane with and to mesh with the first spur gear, and means limiting the closeness of the mesh of the gears while yieldingly holding the gears against separation by movement in the plane common to both of said gears.

2. The combination with a spur gear, of a second spur gear in mesh therewith, a bracket supporting said second gear, means on which said first gear and said bracket are mounted, the mounting of said bracket being pivotal, the axis thereof being parallel to the axes of both said gears, a spring tending to turn the bracket on its pivot and thereby press the second gear toward the first gear, and a stop to limit the action of said spring.

3. The combination with a spur gear, of a support therefor, a bracket, a support for said bracket, said bracket being pivoted to said support and having a bearing at one side of the pivot point and an arm extending on the other side, a second spur gear mounted to rotate in said bearing, and a spring between said arm and said support for yieldingly holding said gears in mesh.

4. The combination with a spur gear, of a support therefor, a bracket, a support for said bracket, said bracket being pivoted to said support and having a bearing at one side of the pivot point and an arm extending on the other side, a second spur gear mounted to rotate in said bearing, a spring between said arm and said support for yieldingly holding said gears in mesh, and an adjustable stop mounted on said bracket to limit the closeness of the mesh of said gears.

5. The combination with a spur gear, of a support therefor, a bracket, a support for said bracket, said bracket being pivoted to said support and having a bearing at one side of the pivot point and an arm extending on the other side, a second spur gear mounted to rotate in said bearing, a spring between said arm and said support for yieldingly holding said gears in mesh and an adjustable stop mounted on said bracket between the bearing and the bracket pivot.

In testimony whereof I affix my signature in the presence of two witnesses.

JESSE G. VINCENT.

Witnesses:
 Le Roi J. Williams,
 Clair J. Cote.

Copies of this patent may be obtained for five cents each, by addressing the "Commissioner of Patents, Washington, D. C."